United States Patent [19]

Main

[11] 4,004,837
[45] Jan. 25, 1977

[54] WHEEL COVER WITH SNAP ON FASTENER
[75] Inventor: John A. Main, Plymouth, Mich.
[73] Assignee: Motor Wheel Corporation, Lansing, Mich.
[22] Filed: Dec. 8, 1975
[21] Appl. No.: 638,814
[52] U.S. Cl. .............................................. 301/37 P
[51] Int. Cl.² ......................................... B60B 7/02
[58] Field of Search .......... 24/73 HC, 73 P, 73 PF; 301/37 R, 37 P, 37 AT, 37 CM, 37 SS, 37 C, 37 CD, 108 R, 108 A; 85/DIG. 2, 5 R, 8.3

[56] References Cited
UNITED STATES PATENTS
3,894,775  7/1975  Christoph ........................ 301/37 P Primary Examiner—Stanley H. Tollberg
Attorney, Agent, or Firm—Barnes, Kisselle, Raisch & Choate

[57] ABSTRACT

A wheel cover with a plurality of axially extending resilient prongs the free ends of which extend through prong receiving holes in the mounting bolt circle area of a disk of a vehicle wheel. The prongs have a cam surface adjacent the free edge thereof which engages the inner edge of the prong receiving holes to abut the free ends of the prongs with the mounting surface of a hub on which the disk is secured to firmly and tightly retain the wheel cover on the wheel.

16 Claims, 3 Drawing Figures

WHEEL COVER WITH SNAP ON FASTENER

This invention relates to removable, decorative covers for vehicle wheels and, more particularly, to a hub cap with a snap-on fastener for removably retaining the cover or cap on the wheel.

The thickness of the metal in the bolt circle area of conventional disks of drop center wheels varies considerably from one disk to another even though the sheet metal blanks from which the disks are formed have the same nominal thickness. Due to this variation, conventional snap-on fasteners which engage both faces of the disk in the bolt circle area provide a loose mounting of the wheel cover or hub cap on the wheel which may be an annoying nuisance if sufficiently loose to make objectionable noises when the vehicles are operated at highway speeds, and may cause undue wear, resulting in weakening of the attachment and eventual loss of the hub cap.

Objects of this invention are to provide a wheel cover, such as a hub cap, with a snap-on fastener engaging the disk of a wheel in the bolt circle area which is positively located and securely releasably retained on the wheel, of rugged and durable construction, economical to manufacture and assemble, and maintenance and service free.

These and other objects, features and advantages of this invention will be apparent from the following detailed description, appended claims and accompanying drawing (drawn to scale) in which:

Figure 1:
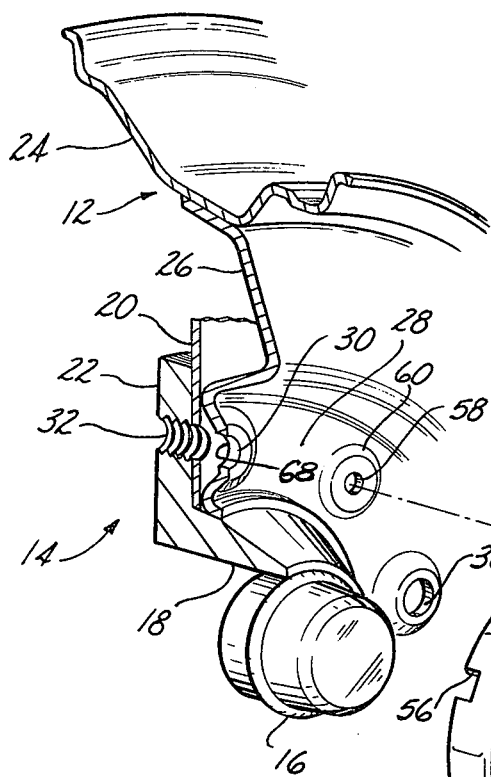
FIG. 1 is a fragmentary isometric view partially in section of a vehicle wheel, brake drum and associated hub with a wheel cover embodying this invention positioned to be mounted on the wheel.

Referring in more detail to the drawing, FIG. 1 illustrates a wheel cover in the form of a hub cap 10 embodying this invention positioned to be mounted on a conventional automotive passenger wheel 12 which, in turn, is received on a wheel hub 14 adapted to be mounted on a spindle (not shown). A grease cap 16 is received in a bore 18 of hub 14, and a backing plate 20 of a brake drum (not otherwise shown) is fixed to the outer face of a flange 22 of hub 14. Wheel 12 has a conventional drop-center steel rim 24 fixed as by welding to the outer periphery or a central steel disk 26. Disk 26 has a conventional bolt circle area 28 with four equally spaced bolt holes 30 therein. Wheel 12 is removably secured to flange 14 by mounting studs (not shown) received in four equally spaced threaded holes 32 in flange 22 of hub 14 which are adapted to register coaxially with mounting holes 30 of wheel 12.

Figure 2:
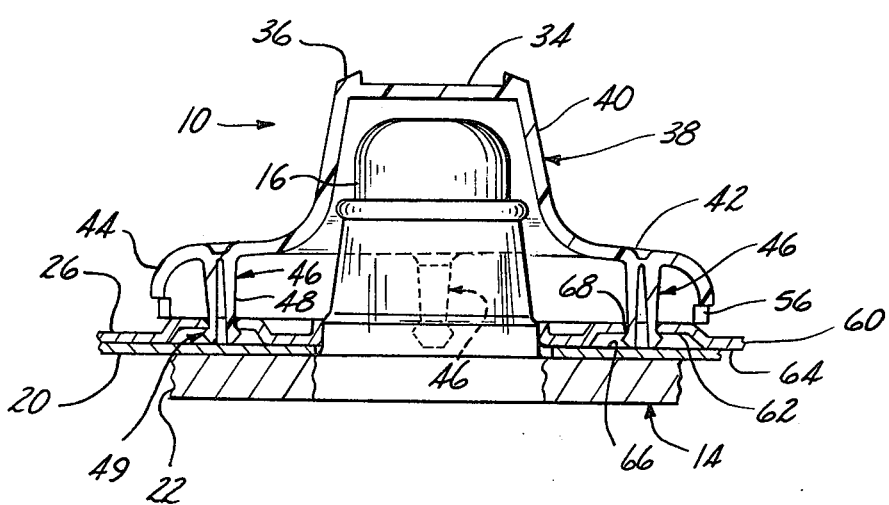
FIG. 2 is a fragmentary center sectional view of the hub and wheel of FIG. 1 with the wheel cover securely mounted thereon.

As shown in FIGS. 1 and 2, hub cap 10 is generally bowl shaped with a generally flat bottom wall 34 encircled by a decorative rib 36 and a side wall 38 defined by a generally axially extending frustoconical portion 40 which curves outwardly into a generally radially extending portion 42 having a reverse curve at its outer periphery and merging in a generally axially extending portion 44. Hub cap 10 is preferably a one-piece unitary homogeneously integral structure preferably injection molded of a plastic material such as polypropylene.

Figure 3:
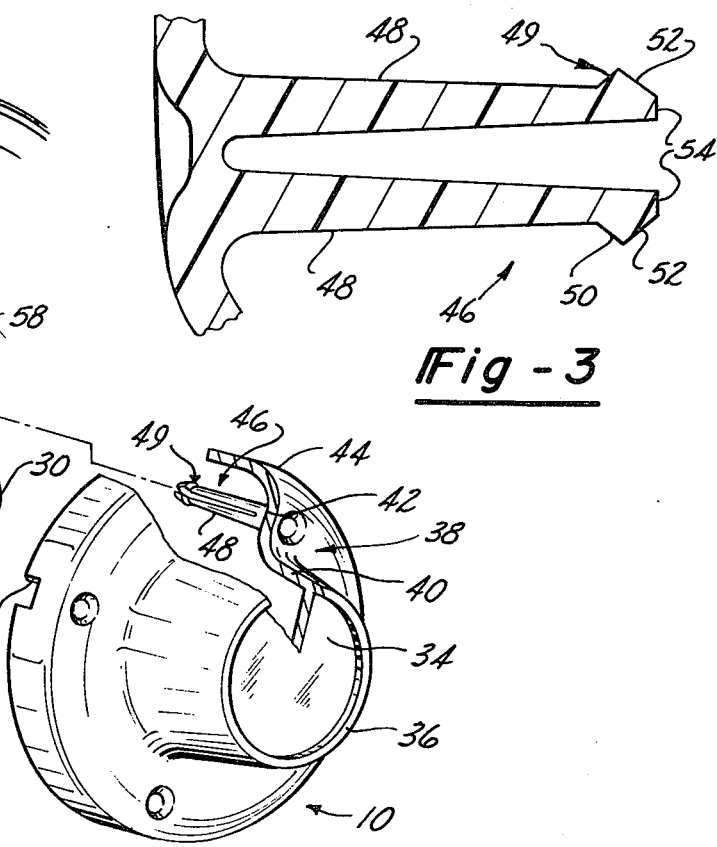
FIG. 3 is an enlarged fragmentary center sectional view of a split prong of the wheel cover of FIGS. 1 and 2.

In accordance with this invention, hub cap 10 is releasably secured to wheel rim 12 by a plurality of equally circumferentially spaced resilient prongs 46 homogeneously integral with and generally axially extending from the inner face of hub cap 10. As shown in FIG. 3, each prong 46 is split or bifurcated to provide two tapered resilient fingers 48 each having a circumferential rib 49 V-shaped in axial cross section and extending around the outer periphery of its free end. Each rib 49 thus provides conical cam surfaces 50 and 52 both inclined with respect to the axis of the finger and to each other. The free end of each finger 48 terminates in a flat abutment surface 54. To facilitate removal of cap 10 from wheel 12, two pry notches 56 are provided diametrically opposite one another in the outer periphery 44 of cap 10 adjacent a diametrically opposite pair of prongs 46.

To retain cap 10 on wheel 12, each prong 46 is individually received in one of four equally spaced retainer holes 58 which extend through associated bosses 60 located in the bolt circle 28 of disk 26. Preferably, although not necessarily, hub cap 10 is provided with the same number of prongs 46 as there are mounting holes 30, prongs 46 are equally circumferentially spaced on hub cap 10, and retainer holes 58 are located in wheel disk 26 equally circumferentially spaced between mounting holes 30.

Due to manufacture and material tolerances, the thickness of the metal of the bosses 60 in the bolt circle area of the wheel disk may vary substantially from one disk to another. However, it has been found that in steel wheel disks produced by conventional stamping processes the distance between inner face 62 (FIG. 2) of bosses 60 and the inner face 64 of the wheel disks in the area immediately adjacent the bosses is substantially constant from one disk to another. Therefore, when wheels 12 are secured to hubs 14, the generally axial dimension between inner faces 62 of bosses 60 and the juxtaposed surface of the outer face 66 of backing plate 20 is also substantially constant. Thus, bosses 60 and plate 20 conjointly provide four pockets each dimensioned within close tolerances for individually receiving therein the free ends of a prong 46. In accordance with one feature of this invention, prongs 46 are received in such pockets through holes 58 of bosses 60 with the end abutment surfaces 54 of each prong urged into firm engagement with backing plate face 66. This engagement is produced by cam face 50 of each prong being urged into firm engagement with the inner edge 68 of each hole 58, as explained in more detail hereinafter. In some hub constructions, the brake drum backing plate is not mounted on the outer face of the hub flange 22 and thus the inner surface 64 of the bolt circle area bears directly on the hub flange 22 when the wheel is secured thereto. With this type of hub construction, abutment surfaces 54 of prongs 46 bear directly on hub flange 22 rather than on the brake drum backing plate as shown in FIG. 2.

To mount hub cap 10 on wheel 12 (with the wheel secured to a hub 14), the hub cap is positioned (as indicated in FIG. 1) so that prongs 46 are coaxially aligned with holes 58 in the bolt circle area of the wheel disc. Hub cap 10 is then moved generally axially toward wheel 12 to bring cam surface 52 of each prong 46 into engagement with the outer edge of the associated hole 58. Cap 10 is then urged further toward the wheel, thereby camming resilient fingers 48 of each prong 46 generally radially inwardly toward each other from their normal unflexed free-state position so that the free ends of each prong can pass through the associated hole 58. As the apex of rib 49 of each prong 46 pass through hole 58 and cam surfaces 50 reach sliding engagement with the inner edge 68 of the hole, resiliency of flexed fingers 48 snaps the free end of each finger generally radially outwardly, thus urging cam surfaces 50 into firm engagement with the inner edges 68 of hole 58. The camming action of surface 50 in turn urges each prong 46 further through the wheel disk until end faces 54 firmly abut outer face 66 of backing plate 20. Thus, the snap action camming engagement provided by prongs 46 tightly and firmly retains hub cap 10 on wheels 12 even though the thickness of the metal of bosses 60 in the bolt circle area of the wheel varies substantially from one wheel to another. Hub cap 10 can be readily removed from wheel 12 by inserting a small pry bar through a selected notch 56 and then manipulating the bar to force hub cap 10 generally axially outwardly of rim 12. This removal force will cause the free ends of fingers 48 of each prong 46 to be cammed radially inwardly so as to pass axially outwardly through holes 58 in disc 26, thereby releasing the hub cap from the wheel.

From the foregoing description it will be apparent that the snap action cam prongs, which can be formed as a homogeneously integral part of a one-piece hub cap preferably made of a plastic material, provide a snap-on fastener wheel cover of rugged and durable construction which can be economically manufactured and assembled and is maintenance and service free.

It is to be understood that an improved form of these snap action cam prongs, wherein a web is interposed in the slot between the fingers so as to be integral with and extend between diagonally opposed edges of the fingers, can be provided to improve the retention characteristics of the prongs by increasing the force required to move the free ends of the fingers toward each other. This improvement is disclosed and claimed in a copending U.S. patent application Ser. No. 638,813 of Dale Meyers filed on Dec. 8, 1975 and entitled "Wheel Cover Snap On Fastener" which is assigned to the Goodyear Tire & Rubber Company of Akron, Ohio, and the disclosure of which is incorporated herein by reference.

I claim:

1. A removable hub cap for a vehicle wheel having a rim and a disk fixed thereto which has a plurality of prong receiving holes disposed in the mounting hole circle area thereof and each arranged to provide a space having a predetermined axial dimension between the inner margin of each prong receiving hole and the surface on which the disk bears when mounted on a vehicle, said removable hub cap comprising; a cap body constructed and arranged to overlie both the prong receiving holes and mounting holes in the disk and to be removable from the disk, a plurality of prongs carried by said body and extending generally axially from one face thereof with the free end of each of said prongs being adapted to pass through one of the prong receiving holes, and cam means on each of said prongs adjacent the free end thereof constructed and arranged to engage said inner margin of one of said prong receiving holes and urge the free end of its associated prong into firm engagement with the surface on which the disk bears when mounted on a vehicle, whereby said removable hub cap is releasably secured and tightly retained on the vehicle wheel when said prongs are inserted in said prong receiving holes with their associated cam means firmly engaging the inner margins of said prong receiving holes and urging the free ends of said prongs into engagement with the surface on which the disk bears when mounted on a vehicle.

2. The hub cap of claim 1 wherein said prongs are homogeneously integral with said cap body.

3. The hub cap of claim 1 wherein said cam means on said prongs comprises a cam surface inclined with respect to the axis of its associated prong and extending radially outwardly of said prong.

4. The hub cap of claim 1 wherein each of said prongs is bifurcated to provide two fingers, said cam means comprises a rib extending generally transversely around at least a portion of the outer periphery of each of said fingers and having a generally V-shaped cross section with its apex terminating radially outwardly of the outer periphery of an adjacent portion of its finger, each of said fingers is resiliently flexible, and the relative dimensions of the outer periphery of the ribs of each of said prongs and said prong receiving holes are such that said fingers are displaced generally radially inwardly from their unflexed position when inserted into an associated prong receiving hole and when the apex of said ribs pass through the associated prong receiving hole, the fingers of the prong snap back toward their unflexed position to urge the cam means of the prong into engagement with the inner margin of the associated prong receiving hole and to cam the free end of the prong into engagement with the surface on which the disk bears when mounted on the vehicle.

5. The hub cap of claim 1 wherein each of said prongs is resiliently flexible and generally radially displaced from its unflexed position when its free end is inserted into its associated prong receiving hole and snaps back toward its unflexed position to urge its associated cam means into engagement with the inner margin of the associated prong receiving hole when its free end passes through the associated prong receiving hole.

6. The hub cap of claim 5 wherein said prongs are homogeneously integral with said cap body.

7. The hub cap of claim 1 wherein each of said prongs is resiliently flexible and said cam means on said prongs comprises a rib extending generally transversely around at least a portion of the outer periphery of its associated prong and having a generally V-shaped cross section with its apex terminating radially outwardly of the outer periphery of an adjacent portion of its associated prong.

8. The hub cap of claim 7 wherein said cap body, prongs and cam means on said prongs are homogeneously integral and made in one piece of a plastic material.

9. The hub cap of claim 7 wherein each of said prongs is bifurcated to provide two fingers each having a cam means thereon comprising a rib.

10. In combination, a vehicle wheel having a rim and a disk fixed thereto, a plurality of prong receiving holes disposed in the mounting hole circle area of said disk and each arranged to provide a space having a predetermined axial dimension between the inner margin of each prong receiving hole and the surface on which the disk bears when mounted on a vehicle, a removable hub cap body constructed and arranged to overlie both said prong receiving holes and mounting holes in said disk and to be removable from said disk, a plurality of prongs carried by said body and extending generally axially from one face thereof with the free end of each of said prongs constructed and arranged to pass through one of said prong receiving holes, and cam means on each of said prongs adjacent the free end thereof constructed and arranged to engage said inner margin of one of said prong receiving holes and urge the free end of its associated prong into firm engagement with the surface on which the disk bears when mounted on a vehicle, whereby said removable hub cap body is releasably secured and tightly retained on said vehicle wheel when said prongs are inserted in said prong receiving holes with their associated cam means firmly engaging the inner margins of said prong receiving holes and urging the free ends of said prongs into engagement with the surface on which the disk bears when mounted on a vehicle.

11. The combination of claim 10 wherein each of said prongs is resiliently flexible and the relative dimensions of the free ends of said prongs and said prong receiving holes are such that the free end of each of said prongs is generally radially displaced from its unflexed position when inserted into its associated prong receiving hole and when the free end passes inwardly through the associated prong receiving hole snaps back toward its unflexed position to urge its associated cam means into engagement with the inner margin of the associated prong receiving hole and cam the free end into engagement with the surface on which the disk bears when mounted on the vehicle.

12. The combination of claim 10 further comprising a plurality of bosses in said mounting hole circle area of said disk and each having one of said prong receiving holes disposed therein and extending therethrough.

13. The combination of claim 12 wherein said bosses are equally circumferentially spaced between wheel mounting holes in said mounting hole circle area of said disk.

14. The combination of claim 10 further comprising a vehicle wheel mounting means to which said disk is attached, said vehicle wheel mounting means having thereon a surface underlying and spaced from said prong receiving holes and bearing on the inner face of said mounting hole circle area of said disk.

15. The combination of claim 14 wherein each of said prongs is resiliently flexible and the relative dimensions of the free ends of said prongs and said prong receiving holes are such that the free end of each of said prongs is generally radially displaced from its unflexed position when inserted into its associated prong receiving hole and when the free end passes inwardly through the associated prong receiving hole snaps back toward its unflexed position to urge its associated cam means into engagement with the inner margin of the associated prong receiving hole and cam the free end into engagement with the surface on which the disk bears when mounted on the vehicle.

16. The combination of claim 14 wherein each of said prongs is bifurcated to provide two fingers, said cam means comprises a rib extending generally transversely around at least a portion of the outer periphery of each of said fingers and having a generally V-shaped cross section with its apex terminating radially outwardly of the outer periphery of an adjacent portion of its finger, each of said fingers is resiliently flexible, and the relative dimensions of the outer periphery of the ribs of each of said prongs and said prong receiving holes are such that said fingers are displaced generally radially inwardly from their unflexed position when inserted into an associated prong receiving hole and when the apex of said ribs pass inwardly through the associated prong receiving hole the fingers of the prong snap back toward their unflexed position to urge the cam means of the prong into engagement with the inner margin of the associated prong receiving hole and to cam the free end of the prong into engagement with the surface on which the disk bears when mounted on the vehicle.

* * * * *